Patented Nov. 28, 1950

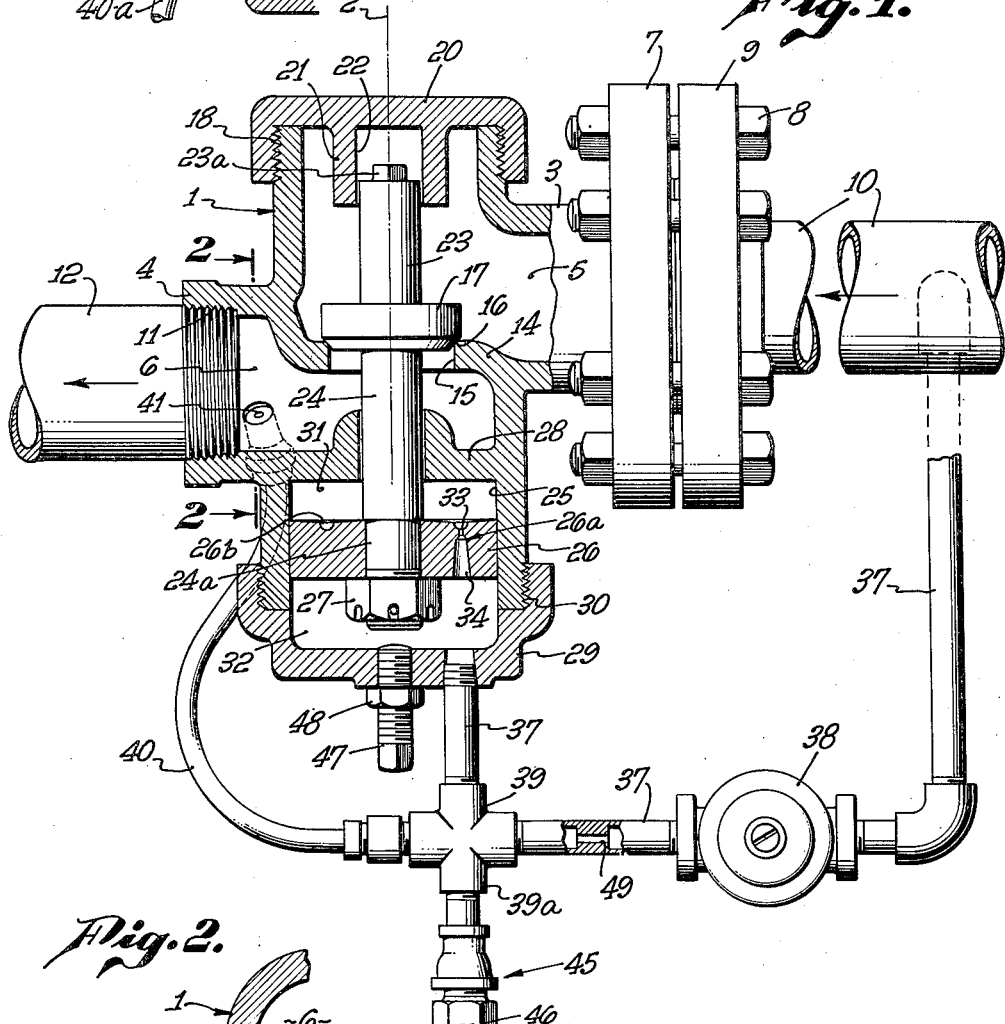

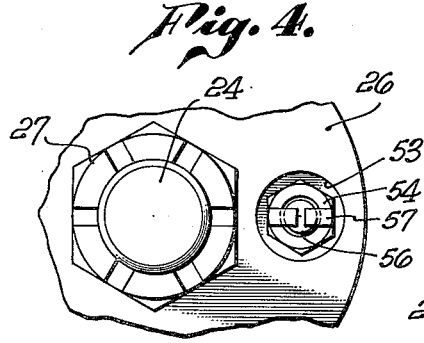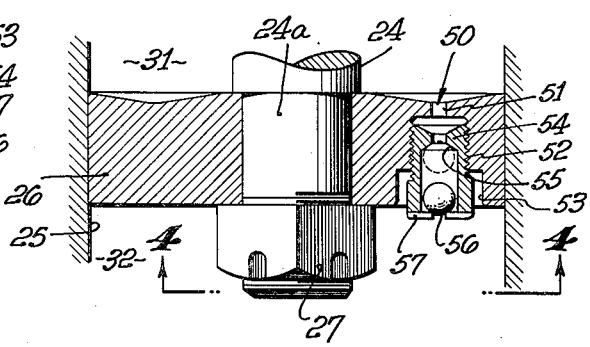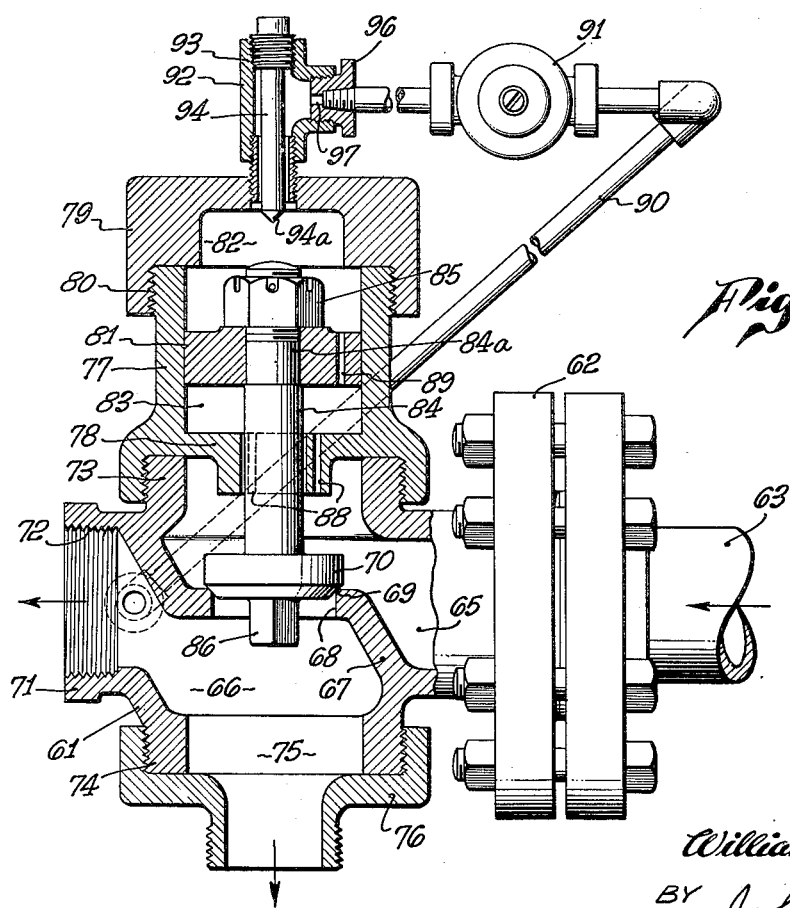

2,532,123

UNITED STATES PATENT OFFICE 2,532,123

PRESSURE OPERATED VALVE

William E. Shafer, San Francisco, Calif.

Application March 21, 1945, Serial No. 583,896

4 Claims. (Cl. 137—139)

1

This invention relates to a valve for controlling fluid under pressure, and which is adapted for operation by said pressure optionally to open and to close.

It is an object of this invention to provide such a valve having an improved and simplified mode of operation.

It is another object of this invention to provide such a valve which may be operated to open and to close in response to the manipulation of a plug cock, a globe valve, or any conventional two-way valve.

It is another object of this invention to provide such a valve in which danger of the valve accidentally remaining in open position is minimized.

It is another object of this invention to provide such a valve which is so arranged that abrupt closing is prevented. In this way, severe shocks and water hammer are prevented.

It is a still further object of this invention to provide a valve which is particularly suited for use as a blow-off for permitting the discharge of mud and sediment from steam boilers, and the like, without interfering with their operation.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Figure 1 is a sectional view showing a valve, embodying the features of the invention, installed for use;

Fig. 2 is a cross section, taken as indicated by line 2—2 of Fig. 1;

Fig. 3 is a fragmentary section on an enlarged scale, showing a modified form of the valve of Fig. 1;

Fig. 4 is a cross section, taken as indicated by line 4—4 of Fig. 3;

Fig. 5 is a view similar to Fig. 1, showing a further modified form of valve; and Fig. 6 is a fragmentary section showing a further modification of the valve of Fig. 1.

Referring to Figs. 1 and 2 of the drawings, a valve is shown in which the valve closure is urged to seat by the pressure, on the valve closure member, of the fluid controlled by the valve; and is adapted to be unseated by the pressure acting in the opposite direction on a member connected with the closure and having a larger area than the closure member. To simplify the control and improve the operation of the valve, the chamber in which the pressure acts to unseat the closure is vented by a small, constantly open port. Thus, by admitting fluid under pressure to this space in an amount greater than can pass out through the vent, the valve will be opened. When this amount is less than the vent will discharge, the valve will close. In this way, a single valve-controlled connection, adapted to connect the pressure chamber with the source of fluid controlled by the main valve, serves to operate the main valve to open and to close. The constantly open vent serves not only as an escape for fluid from the pressure chamber when it is desired that the main valve close, which by restricting the rate of such escape prevents too rapid closing of the valve, but also serves to reduce the pressure applied to open the main valve, thus guarding against too rapid opening.

As shown, the valve comprises a generally cylindrical body 1 having a vertically extending axis 2 and provided with oppositely directed nozzles 3 and 4 forming the inlet and outlet passages 5 and 6, respectively. As a means of connecting the valve body 1 to a conduit, a boiler, or the like, the inlet nozzle 3 is provided with an integral flange 7 which is shown by way of example as connected by bolts 8 to a companion flange 9 on a pipe line 10. The nozzle 4 is internally threaded with a standard pipe thread 11 to receive a tail pipe. As will appear from an inspection of Fig. 1, the valve body 1 is "streamlined"; that is, the nozzle 4 is positioned low on the body so as to give a free discharge through the outlet 6 and avoid pockets or cavities therein which are likely to retain portions of the material discharged by the valve.

The inlet and outlet passages 5 and 6 are separated by a web wall 14 in body 1, having a port 15 by which the passages are adapted to be in communication, and providing a valve seat 16 for the valve closure member 17. The upper end portion of body 1 is exteriorly threaded, as at 18, to accommodate a cap 20. This cap 20 has a downwardly projecting boss 21 with a cylindrical bore 22 for receiving and guiding the upper end portion 23 of a valve stem 24 on which is fixed the valve closure member 17. This upper end portion 23 is provided with a squared portion 23—a adapted to be engaged by a wrench to facilitate assembly and disassembly of the valve stem and connected parts.

The lower end portion of the body 1 is elongated to form a cylinder 25 for accommodating a piston 26 fixed on a reduced portion 24—a of stem 24 by a castellated nut 27. The cylinder 25 is closed at its upper end by a wall 28, which separates the cylinder from the outlet passage 4 and, at its lower end, by a cap 29 threaded on body 1 at 30. The piston 26 thus serves to divide the cylinder 25 into upper and lower chambers 31 and 32. The chamber 31 is in continuous communication with the outlet passage 4 by clearance of the order of one-sixty-fourth of an inch provided in wall 28 around valve stem 24.

Chambers 31 and 32 are also in continuous communication with each other by a port 26—a extending through the piston 26. In this way, drainage of chamber 31 to prevent accumulation of liquid therein is provided. The top of piston 26 has an annular depression 26—b from which the port 26—a leads. Port 26—a has an upper constricted portion 33 of small diameter, for example, one thirty-second of an inch and of short length, opening into a larger conical portion 34. In this way, any tendency of the port 26—a to become clogged is obviated.

Pressure in the discharge line 10 acts on valve closure 17 to maintain it seated, and means are provided for optionally admitting pressure from the source with which the line 10 is connected to chamber 32, where it acts on piston 26 to unseat valve 17, due to the greater area of the piston 26 as compared with the valve closure 17. For this purpose, a conduit 37 is shown for supplying pressure to chamber 32, a control valve 38 being interposed in the conduit 37 for controlling passage of fluid therethrough. In the event that the line 10 is a blow-off line for discharging mud or accumulated solids from a boiler, or the like, the conduit 37 must be connected to the boiler at a point sufficiently high to ensure against passage of such solids into the cylinder 25, preferably at a point where only dry steam will be delivered to the cylinder. On the other hand, if the line 10 is handling only clear liquids, the conduit 37 may be connected directly to the line 10, as indicated by the broken lines in Fig. 1.

A pipe fitting 39 in the form of a cross also is interposed in conduit 37, being positioned between control valve 38 and the cylinder chamber 32. A venting conduit 40 leads from the cross 39 to a constantly open vent 41 in the discharge passage 6 (see, also, Fig. 2). The vent 41 is of small size, for example, having a diameter of three-thirty-seconds of an inch, and may be formed in any convenient manner. Thus, the conduit 40 may be of flexible copper tubing connected to the valve body 1 by a conventional solderless fitting 42 of the type usually known as a Parker fitting. However, the body 43 of fitting 42 is modified by having the passage 44 therethrough reduced in size to serve as the vent 41. As clearly shown in Fig. 2, the passage 44 is tapered, to provide an increasing cross section in the direction of discharge, thus avoiding danger of clogging.

It is to be noted that the fitting 42 is inclined in the direction of the fluid flow through the outlet passage 6. In this way, the fitting 42 acts as an eductor when the valve 1 is discharging, the discharging fluid acting to reduce the pressure in the chamber 32. It is not essential that the vent 41 be in the discharge nozzle 4, however. This is necessary only when it is desired to prevent loss of fluid which the valve 1 is handling; otherwise, the vent 41 may be open to the atmosphere.

The downwardly directed branch 39—a of the cross 39 is arranged to drain the conduits 37 and 40, as well as cylinder 25. For this purpose, it may be provided with a small drain port of suitable size which is constantly open, instead of the vent 41. However, with such an arrangement, substantial escape of the controlled fluid occurs through such port when pressure is applied to open the valve 1.

Accordingly, the branch 39—a is provided with a drain valve structure 45 having a port 46 which is open when the valve is not subjected to pressure, but is arranged to be closed when pressure is applied to the valve. Such a valve is disclosed in a patent granted to William E. Shafer on January 12, 1943, bearing Patent Number 2,307,963, and entitled "Blowoff Valve System." In this way, proper drainage of the parts is assured and, at the same time, escape of the controlled fluid is prevented.

The operation of the valve is very simple. With the control valve 38 closed, pressure of the controlled fluid maintains the closure 17 seated. At the same time, the drain valve 45 is open to permit any residual liquid or leakage to drain from the valve body 1 and cylinder 25 through port 46. When it is desired to unseat the closure 17, the valve 38 is opened to admit fluid pressure to chamber 32, where it acts to move piston 26 upwardly and unseat the closure. As long as valve 38 is open, the closure 17 is maintained unseated. When valve 38 is closed, the fluid in chamber 32 finds a ready escape through conduit 40 and the constantly open vent 41, so that the pressure on valve closure 17, together with the weight of the closure, urges the closure to seat. Thus, an escape path is always open, and is effective even if the pressure in chamber 32 may be sufficient to close port 46 in drain valve 45.

For exerting an additional force urging the closure 17 to seat, particularly if there is any pressure built up in the outlet passage 6, or any turbulence below the port 15 tending to maintain the closure 17 unseated, pressure of the discharging fluid is permitted to enter chamber 31 freely through the clearance provided about the stem 24. Such pressure thus exerts a force on the upper side of the piston 26, urging the piston 26 and the closure 17 downwardly. Such pressure will exceed that in chamber 32, due to the reduction of pressure therein by the eductor action of the vent 41 in the arrangement shown, or in case the vent is open to the atmosphere.

As a means of unseating closure 17 when no pressure is present, for this purpose a cap screw 47 is threaded through head 29 which, by appropriate rotation, engages the lower end of stem 24 and raises the closure 17 from its seat 16. A lock nut 48 is provided for retaining the screw 47 in its lowered position, free of stem 24.

To improve the operation of the valve when handling water or other clear liquid, it may be desirable to provide a constriction in the conduit 37, such as indicated diagrammatically at 49. This constriction may provide an opening of five-thirty-seconds of an inch when the vents, clearances, and other parts have the sizes previously indicated as desirable. Such a constriction is not necessary if the valve is being used as a blow-off valve, operated by dry steam.

It may be desirable to provide a larger port through the piston 26 to permit freer drainage from chamber 31. In this case, means must be provided to prevent too rapid transfer of pressure from chamber 32 to chamber 31 when it is desired to open the valve. Such an arrangement is shown in Figs. 3 and 4. Therein, the piston 26 is shown as having a drain port 50 with an upper end portion 51 having a diameter of the order of one-eighth of an inch, an intermediate threaded portion 52 of larger diameter, and a counterbore 53 at its lower end. A tubular valve cage 54 is threaded into the port 50, and provides a downwardly facing valve seat 55, as well as enclosing a ball check 56 for free movement to and away from the seat. Fingers 57 are found on the cage 54 for retaining ball 56 therein, being bent to the position shown after the ball is placed in the body.

When the pressure in chamber 32 does not substantially exceed the pressure in chamber 31, the ball 56 rests in fingers 57, as shown by the full lines in Fig. 3, permitting free drainage from chamber 31 downwardly through the valve cage 54. However, upon an increase of fluid pressure in chamber 32, the fluid pressure serves to seat ball 56, preventing upward passage of fluid through the valve cage.

In the form of the invention disclosed in Fig. 5, a valve is shown which is similar to the first described form, wherein the pressure of the controlled fluid is relied on to close the valve. However, in this case, the valve is arranged to open in response to release of such pressure: this type of valve is not well adapted for use as blow-off or for handling liquids containing solids, but operates well with clear liquids.

The valve comprises a valve body 61 having an integral flange 62 by which it may be attached to a pipe line 63. The body 61 has an inlet passage 65 and an outlet space 66 separated by a web wall 67 having a port 68 therein which provides a seat 69 for a valve closure member 70. When the closure member 70 is seated, communication between the inlet passages 65 and the outlet space 66 is interrupted.

The body 61 has an outlet nozzle 71, shown as axially aligned with the inlet 65 and interiorly threaded at 72 to receive a tail pipe (not shown). If desired, the nozzle 71 could be located below the inlet 65 to give a streamlined discharge, as shown in Fig. 1. The body 61 also has upper and lower bosses 73 and 74 axially aligned with seat 69. The lower boss 74 provides an additional outlet 75 from the space 66, and is exteriorly threaded to receive an adapter 76 to which a tail pipe (not shown) may be attached. Both outlets 71 and 75 may be used, or either may be closed as desired, and only one used.

The upper boss 73 is also exteriorly threaded for attachment to an operating cylinder 77, which has a lower integral head or wall 78 separating the space within the cylinder from the inlet passage 65 in the body 61. The upper end of the cylinder 77 is closed by head 79, threaded on the cylinder at 80.

A piston 81 serves to divide the cylinder 77 into upper and lower chambers 82 and 83, and is connected to the closure member 70 by a valve stem 84 freely slidable through a suitable opening in wall 78. The valve stem 84 has a reduced upper portion 84—a upon which the piston 81 is secured by a castellated nut 85 threaded on the reduced portion 84—a. The stem 84 may have a square lower extension 86 to facilitate assembly and disassembly of the piston 81 and the valve stem.

The lower chamber 83 is in continuous communication with the valve inlet 65, as by a plurality of ports 88 through wall 78, and also with the upper chamber 82 as by a port 89 through the piston 81. It is essential, as will presently appear, that the area of the port 89 through the piston be substantially less than the area of the port or ports 88 through the wall 78. Thus, for example, there may be three ports 88, each having a diameter of one-eighth of an inch, and but one port 89 of about the same diameter.

The upper chamber 82 is adapted to communicate with the discharge space 66 by a conduit 90 having a control valve 91 interposed therein and connected to the cylinder head 79 by a pipe T 92. This T 92 has its run extending axially above valve stem 84, a special pipe plug 93 being threaded in its upper end. This plug 93 has a straight reduced portion 94, the lower end 94—a of which is adapted to be engaged by the upper end of the valve stem 84, thereby serving to limit upward movement of piston 81 and valve 70.

Since the conduit 90 may be quite small, such as one-eighth inch pipe size, and T 92 must be large enough to accommodate the rod 94 (for example, three-eighths inch pipe size), the conduit is connected to the T by a special reducing bushing 96 providing a restricted port 97 with a diameter, for example, of the order of thirteen-sixty-fourths of an inch.

With the control valve 91 closed, fluid pressure in the inlet passage 65 will act on the upper surface of closure 70, urging it to seat. It will also act in chamber 83, via ports 88, to urge piston 81 upwardly, and in chamber 82, via port 89, to urge piston 81 downwardly. Since there is a preponderance of area on which the pressure acts to urge the piston 81 and closure 70 downward, the closure will remain seated.

When it is desired to unseat the closure 70, the control valve 91 is opened, releasing the pressure in chamber 82. Fluid pressure is still present in chamber 83 urging piston 81 upwardly; and, since the piston 81 has a substantially greater area on which the pressure acts than does the closure member 70, the piston 81 and closure 70 move upwardly and open port 68. When the control valve 91 is closed, the original pressure conditions are re-established and closure 70 is urged to seat. It will be apparent that port 89 must not be of such size as to permit fluid pressure to escape from chamber 83 as fast as it enters through ports 88, as this would prevent the building up of pressure in chamber 83 required to move piston 81 upwardly. Further, the restricted size of port 89 prevents too rapid building up of pressure in chamber 82 when it is desired to close the valve, thus preventing the closure 70 being seated with a severe shock.

While specific sizes for ports and the like have been mentioned, it is to be understood that these are merely illustrative and have been found satisfactory with valves of certain proportions operating in certain pressure ranges, and are not necessarily such as would be satisfactory with differently proportioned valves operating under higher or lower pressures, or in other temperature ranges.

In Fig. 6 a modification of the valve of Fig. 1 is shown, in which the constantly open vent is arranged to ensure complete drainage of the outlet passage, parts corresponding with those of Fig. 1 bearing the same numbers followed by "a." For this purpose, the fitting 42—a is positioned in the bottom of the nozzle 4—a and is inclined as before to give an eduction effect. The nozzle 42—a is of such length as to extend slightly into the discharge opening 6—a. Thus a shoulder 42—b is formed which deflects the discharging material up and over the mouth of the passage 44—a, as indicated by the arrow, preventing accumulation of solids in the passage. It will be clear that, with this arrangement, when there is no pressure in chamber 32, continuous drainage from the lowest point of the outlet passage 6 is provided via vents 41—a and the connections thereto.

The inventor claims:

1. In a valve, a valve body having a vertically directed axis and inlet and outlet passages with overlapping portions separated by a wall in the body, there being an axial port through said wall adapted to establish communication between said passages, a closure member for controlling the port and urged to closed position by fluid pressure in the inlet passage, a cylinder connected to the body adjacent said outlet passage and closed at its opposite ends, a piston slidable in said clyinder and connected to operate said closure member, and co-operating with the cylinder to form a pair of chambers, there being a restricted port through said piston for establishing communication between the chambers, means whereby that chamber adjacent the outlet passage is in continuous communication with the outlet passage, means forming a constantly open vent for the other chamber at the lower end of said other chamber, and means for optionally admitting fluid under pressure to said other chamber at a rate greater than that at which said fluid can escape through said vent and said restricted port, to move the piston to actuate the closure.

2. In a valve, a valve body having a vertically directed axis and inlet and outlet passages with overlapping portions separated by a wall in the body, there being an axial port through said wall adapted to establish communication between said passages, a closure member for controlling the port and urged to closed position by fluid pressure in the inlet passage, a cylinder connected to the body adjacent said outlet passage and closed at its opposite ends, a piston slidable in said cylinder and connected to operate said closure member, and co-operating with the cylinder to form a pair of chambers, means whereby that chamber adjacent the outlet passage is in continuous communication with said outlet passage, means forming a constantly open vent for the other chamber, there being a port through said piston whereby said chambers are normally in communication, means for admitting fluid pressure to said other chamber at a rate greater than fluid can escape from said vent, and means for closing said piston port in response to said fluid pressure.

3. In a valve, a valve body having a vertically directed axis and inlet and outlet passages with overlapping portions separated by a wall in the body, there being an axial port through said wall adapted to establish communication between said passages, a closure member for controlling the port and urged to closed position by fluid pressure in the inlet passage, a cylinder connected to the body adjacent said outlet passage and closed at its opposite ends, a piston slidable in said cylinder and connected to operate said closure member, and co-operating with the cylinder to form a pair of chambers, there being a restricted port through said piston for establishing communication between the chambers, means whereby that chamber adjacent the outlet passage is in continuous communication with the outlet passage, means forming a constantly open vent between the other chamber and said outlet passage and arranged to form an eductor whereby the pressure in said other chamber is reduced below that created in the chamber adjacent the said passage by said fluid when the closure is unseated, to urge the closure to seat.

4. In a valve, a valve body having inlet and outlet passages with overlapping portions separated by a wall in the body, there being a port through said wall adapted to establish communication between said passages, a closure member for controlling the port and urged to closed position by fluid pressure in the inlet passage, a cylinder connected to the body adjacent one of said passages and closed at its opposite ends, a piston slidable in said cylinder and connected to operate said closure member, and cooperating with the cylinder to form a pair of chambers, there being a restricted port through said piston for establishing communication between the chambers, means whereby that chamber adjacent said one passage is in continuous communication with said one passage, means forming a constantly open vent between the other chamber and said outlet passage and arranged to form an eductor whereby the pressure in said other chamber is reduced below that created in the chamber adjacent the said one passage by said fluid when the closure is unseated, to urge the closure to seat.

WILLIAM E. SHAFER.

REFERENCES CITED

The following references are of record in the file of this patent:

UNITED STATES PATENTS

| Number | Name | Date |
|---|---|---|
| 540,003 | Reed | May 28, 1895 |
| 551,370 | Donnelly | Dec. 17, 1895 |
| 624,890 | Batchelor | May 9, 1899 |
| 848,951 | Aeppli-Stocker | Apr. 2, 1907 |
| 859,152 | Tippett | July 2, 1907 |
| 1,233,898 | Miller | July 17, 1917 |
| 1,250,388 | Titus | Dec. 18, 1917 |
| 1,307,207 | Mitchell | June 17, 1919 |
| 1,461,835 | Strond | July 17, 1923 |
| 1,548,093 | McCormick | Aug. 4, 1925 |
| 1,750,317 | Hope | Mar. 11, 1930 |
| 2,177,099 | Dreyer | Oct. 24, 1939 |
| 2,205,033 | Dreyer | June 18, 1940 |
| 2,319,907 | Stirling | May 25, 1943 |

FOREIGN PATENTS

| Number | Country | Date |
|---|---|---|
| 455,133 | Germany | Jan. 25, 1928 |
| 551,248 | Great Britain | Feb. 15, 1943 |